United States Patent
Langheinz

(10) Patent No.: US 9,784,459 B2
(45) Date of Patent: Oct. 10, 2017

(54) ICE SLURRY PRODUCING APPARATUS AND METHOD THEREFOR

(71) Applicant: Hubert Langheinz KALTETECHNIK, Starzach (DE)

(72) Inventor: Hubert Langheinz, Starzach (DE)

(73) Assignee: Hubert Langheinz KALTETECHNIK, Starzach (DE)

( * ) Notice: Subject to any disclaimer, the term of this patent is extended or adjusted under 35 U.S.C. 154(b) by 289 days.

(21) Appl. No.: 14/402,057

(22) PCT Filed: May 17, 2013

(86) PCT No.: PCT/EP2013/060242
§ 371 (c)(1),
(2) Date: Jan. 5, 2015

(87) PCT Pub. No.: WO2013/174747
PCT Pub. Date: Nov. 28, 2013

(65) Prior Publication Data
US 2015/0128620 A1    May 14, 2015

(30) Foreign Application Priority Data
May 23, 2012    (DE) .......................... 10 2012 104 429

(51) Int. Cl.
*F25C 1/24*  (2006.01)
*F24F 5/00*  (2006.01)
(Continued)

(52) U.S. Cl.
CPC .............. *F24F 5/0021* (2013.01); *F25C 1/00* (2013.01); *F25C 1/12* (2013.01); *F28D 20/02* (2013.01);
(Continued)

(58) Field of Classification Search
CPC ...... F28D 20/02; F25C 2301/002; F25C 1/12; F25D 17/02
See application file for complete search history.

(56) References Cited

U.S. PATENT DOCUMENTS 3,869,870 A    3/1975   Kuehner
4,796,441 A *  1/1989   Goldstein ............. F25B 29/003
                                                             165/94
(Continued)

FOREIGN PATENT DOCUMENTS

DE           3486374 T2      11/1995
DE        199 38 044 C1      10/2000
(Continued)

OTHER PUBLICATIONS

International Search Report for corresponding International Application No. PCT/EP2013/060242 mailed Apr. 16, 2014.

*Primary Examiner* — Steve Tanenbaum
(74) *Attorney, Agent, or Firm* — Renner Otto Boisselle & Sklar, LLP

(57) ABSTRACT

The invention relates to an energy system, and more particularly to an air conditioning system for air conditioning rooms, comprising an energy source for heat pump systems, in which energy and/or heat is stored in a latent energy or heat storage system, comprising an ice slurry production device (100) for producing ice slurry from a liquid ice slurry brine (10), which operate according to a method for air conditioning rooms, in which energy or heat is stored or buffered in a latent energy or heat storage system and/or removed or extracted therefrom, wherein ice slurry is provided as the latent energy or heat storage system, or according to a method for producing ice slurry from an ice slurry brine (10), comprising the following steps: filling a housing (110) with the liquid ice slurry brine; cooling the liquid ice slurry brine by bringing it in contact with a heat exchanger
(Continued)

device (220) disposed in the housing (110) while stirring the ice slurry brine (10) so as to generate the ice slurry, wherein, when an ice layer forms on the heat exchanger device (200), cooling is interrupted as soon as the ice layer reaches a predetermined thickness, and cooling is continued as soon as the ice layer drops below the predetermined thickness.

14 Claims, 14 Drawing Sheets

(51) Int. Cl.
  *F25C 1/12*    (2006.01)
  *F25C 1/00*    (2006.01)
  *F28D 20/02*   (2006.01)
(52) U.S. Cl.
  CPC ....... *F25C 2301/002* (2013.01); *Y02P 60/855* (2015.11)

(56)  References Cited

U.S. PATENT DOCUMENTS

| | | | | |
|---|---|---|---|---|
| 5,139,549 A | * | 8/1992 | Knodel | F24F 5/0017 62/123 |
| 5,220,801 A | * | 6/1993 | Butler | F17C 6/00 62/54.1 |
| 2006/0218945 A1 | * | 10/2006 | Goldstein | A23G 9/228 62/135 |

FOREIGN PATENT DOCUMENTS

EP    0 168 537 A2    1/1986
WO    WO 2006/102743 A1    10/2006

* cited by examiner

ICE SLURRY PRODUCING APPARATUS AND METHOD THEREFOR

TECHNICAL FIELD OF THE INVENTION

The invention relates to a method for producing ice slurry from an ice slurry brine.

The invention further relates to a method for air conditioning rooms, in which heat is stored in a latent heat storage system.

The invention also relates to an ice slurry production device for producing ice slurry from a liquid ice slurry brine according to the preamble of claim 10.

The invention furthermore relates to an air conditioning system for air conditioning rooms or for heating process water, as an energy source for heat pump systems, in which energy and/or heat is stored in a latent heat storage system and/or withdrawn therefrom.

And finally the invention relates to a use of ice slurry.

Ice slurry, methods and devices for the production thereof are generally known. Ice slurry is also referred to as ice slush, slurry, slush ice, slurry ice, pumpable ice, liquid ice and the like.

DISCUSSION OF RELATED ART

An ice making machine is known from DE 34 86 374 T2, comprising: a housing having an inlet for receiving a liquid in the form of an aqueous solution having a concentration that is below the eutectic concentration thereof, from which the ice is to be made; an outlet to allow ice to egress from the housing; a heat exchanger in the housing, having a coolant inlet and a coolant outlet to allow a flow of coolants for the purpose of extracting heat from the liquid, and at least one heat exchanger surface, which separates the coolant from the liquid; a scraper, which is disposed in the housing and is movable about an axis, wherein the same is disposed in the housing and is movable about an axis, wherein the scraper and the aforementioned respective heat exchanger surface extend transversely to the aforementioned axis; means for receiving an amount of liquid in the housing so as to substantially fill the housing and cover the respective heat exchanger surface, wherein the scraper is in contact with the respective heat exchanger surface and can be moved about the axis so as to scour the respective heat exchanger surface, and the ice making machine further comprising: a drive, which drives the scraper and moves the same across the aforementioned heat exchanger surface at such a speed that the scraper scours the respective heat exchanger surface during consecutive revolutions over the same so as to scrape off a cooled layer of the liquid from the respective heat exchanger surface before the ice crystallizes thereon, wherein the scraper supplies liquid from the respective heat exchanger surface to the total liquid in the housing so as to maintain a substantially uniform temperature there.

Therefore, it is an object of the present invention to create a method and an ice slurry production device in which ice slurry is generated more homogeneously and efficiently. Moreover, it is an object to use the ice slurry, or the method and the device for the production thereof, for an air conditioning or energy system using ice slurry as a latent energy storage system.

These and further objects are achieved proceeding from a method, an ice slurry production device, an air conditioning system, and a use in conjunction with the features thereof as described herein. Advantageous refinements of the invention are described in the dependent claims.

SUMMARY OF THE INVENTION

The invention encompasses the technical teaching that, in a method for producing ice slurry from an ice slurry brine, comprising the steps of: filling a housing with the liquid ice slurry brine; cooling the liquid ice slurry brine, or the ice slurry that has already been produced, by bringing it in contact with a heat exchanger device, or, in more general terms, with a cooling device, disposed in the housing while stirring, in particular continuously stirring, the ice slurry brine so as to generate the ice slurry, it is provided that, when an ice layer forms on the heat exchanger device, cooling is interrupted as soon as the ice layer reaches a predetermined thickness, and that cooling is continued as soon as the ice layer drops below the predetermined thickness. The ice slurry is produced from a liquid ice slurry brine. For this purpose, an ice slurry brine having a predetermined percentage of salt is produced. The ice slurry brine preferably comprises water, for example tap water, and a salt, for example common salt, NaCl or the like, as constituents. The ice slurry brine is preferably mixed as an approximately 0.01 to 10% ice slurry brine, preferably as an approximately 0.5 to 4.5% ice slurry brine, and most preferably as an approximately 1.0 to 3.5% ice slurry brine. So as to provide a desired ice slurry brine having an appropriate mixing ratio, a saturated salt solution of the ice slurry solution is provided. For example, when using NaCl and $H_2O$ as the ice slurry brine, a saturated solution of $NaCl+H_2O$ is provided or mixed in one step. Moreover, separately from this, a further ice slurry brine is provided. In the further ice slurry brine, first a desired solution ratio of NaCl to $H_2O$ is detected. If the sodium chloride (NaCl) content, or the salt content in general, of the solution is too high, $H_2O$ is added. If the $H_2O$ content of the solution is too high, some of the saturated ice slurry brine is added to the further ice slurry brine. This level regulation is preferably regulated automatically or via a regulating loop. In this process, a desired concentration value is established. The concentration value is ascertained. If desired concentration value is exceeded or no longer met, a desired constituent is added, for example from the saturated solution or an unsaturated solution and/or a solution having a low concentration. When a desired concentration value is reached, the ice slurry brine is added to a container in which the cooling takes place. The container preferably has a cylindrical design; in another mode it has a conical design. The container is preferably insulated in keeping with the temperature of the medium and the ambient temperature so as to prevent transmission heat losses and dropping below the dew point. In another embodiment, the container has a double-walled design so as to create an additional heat exchanger surface on the inside wall. The container is preferably designed as a cooling container; in another embodiment, it is designed as a heating container, or as a cooling and heating container. In one step, the ice slurry brine is pre-cooled before being added to the container. Adding is preferably carried out in a controlled manner, in particular controlled as a function of a fill level of the container. The adding is preferably controlled in such a way that a desired fill level is adhered to. As soon as the ice slurry brine having the desired concentration ratio is added to the container, and the brine thus makes contact with the heat exchanger located there at the appropriate heat exchanger surfaces, the process of cooling the ice slurry brine commences. Cooling takes place in a controlled manner, for example in a temperature-controlled, time-controlled, energy-controlled, ice thickness-controlled manner, or the like. Cooling preferably takes place while continuously stirring the ice slurry brine. In this way, thorough mixing of the ice slurry brine is achieved from the outset. Over the course of the process of cooling the ice slurry brine, crystals form, and thus an ice layer forms at the heat exchanger surfaces. Since stirring takes place without contact with the heat exchanger surfaces, stirring is initially not blocked by the ice layer. However, stirring also takes place in close proximity to the heat exchanger surfaces. Here, a distance between a stirring surface of a stirring element and a heat exchanger surface is selected in such a way that stirring cannot be blocked until a predetermined ice thickness has been reached. The distance is thus selected so that it is in the range of approximately 0.1 to 60 millimeters, preferably in the range of approximately 0.1 to 30 millimeters, and most preferably in a range from 0.1 to 5 millimeters. If an ice layer is formed on the heat exchanger surface which has an ice layer thickness that exceeds a predefined value, cooling is interrupted, so that the ice that has formed on the heat exchanger surface can thaw or can dissolve in the ice slurry brine. As soon as the ice layer thickness drops below a predefined value, or as soon as a predefined time window or another controlled variable is exceeded, cooling is continued. This process continues until a desired consistency of ice slurry has been reached. The finished ice slurry is pumpable and is withdrawn from the container via a draw-off point.

The ice slurry production device is designed to produce from approximately 5 kg to 20 t of ice slurry per hour, and preferably from 25 kg to 250 kg.

In one embodiment, a food-safe cooling medium, for example food-safe brine or the like, is used as the cooling medium for cooling by way of the heat exchanger. In this way, the method and the device described hereafter for producing ice slurry can be used in the food industry. In the event of a potential leakage, the food-safe cooling medium comes in contact with the ice slurry, and consequently there is no risk for users from contamination. A refrigerant for cooling the cooling medium flows through a secondary circuit. In other applications, for example when cooling concrete or the like, a technical brine is used instead of a food-safe cooling medium. In general, a water/antifreeze mixture is used as the cooling medium.

In another embodiment, a refrigerant is used as the cooling medium for cooling, so that the method or the device is operated in a direct evaporator mode or as a direct evaporator. A refrigerant is $CO_2$ or the like, for example.

One embodiment of the present invention provides for a layer thickness detection to be carried out. The layer thickness detection is carried out in a variety of ways, for example directly, by directly measuring the layer thickness, for example visually, haptically, by way of acoustic or other waves, or the like, or indirectly, for example by detecting derived variables. The layer thickness detection is preferably carried out indirectly. The layer thickness detection is carried out, for example, by way of stirring or by a distance between the ice and a stirring element. If the ice layer is too thick, stirring is blocked. As a result, the resistance increases for a stirrer carrying out the stirring. By detecting the resistance, it is possible to infer when an ice layer is too thick. Cooling is accordingly interrupted when the increase in resistance is sufficient. The interruption takes place in a time-controlled manner, an ice layer thickness-controlled manner, a temperature-controlled manner, or the like. For example, the interruption takes place for a preset or variable time period. In another embodiment, the interruption takes place as a function of the ice layer thickness, and in other embodiments as a function of the resistance. In another embodiment, the layer thickness detection is carried out in a manner integrated with the stirring process.

In another embodiment of the present invention, it is provided that stirring takes place without contact with the heat exchanger device. Stirring takes place without contact with the heat exchanger device, and more particularly the heat exchanger surfaces. Stirring takes place along the heat exchanger surfaces, whereby thorough mixing of the ice formed on the heat exchanger surfaces and the ice slurry brine is achieved. Parallel stirring in multiple locations is preferred. The stirring process is in particular designed as an axial and/or radial stirring process. In one embodiment, stirring takes place in a plane, for example in a plane parallel to the heat exchanger surfaces. The ice slurry brine and/or the ice is preferably moved radially outwardly along the heat exchanger surfaces. In another embodiment, stirring takes place in at least one further direction, for example perpendicularly to the above-described direction.

Yet another embodiment of the present invention provides for the method to be carried out in a slanted position. In particular, at least the housing is inclined for carrying out the method. For this purpose, the housing, the heat exchanger device and/or the stirring device or the stirrer are oriented obliquely. Due to the different properties of the ice slurry, the ice and the ice slurry brine, the ice slurry brine is moved to the lowermost point of the housing in the case of a slanted position, for example due to gravity. Due to the lower density, the finished ice slurry is moved to a higher point. Finished ice slurry is thus situated in a higher position. Accordingly, ice slurry that is not yet finished, for example ice slurry brine, or ice slurry brine with non-mixed ice, will be situated at a lower point or location. By appropriately disposing a draw-off point in a higher location, ice slurry can thus be withdrawn from the container before the entire ice slurry brine has been converted into ice slurry. In this way, an improved production of ice slurry can be achieved, since ice slurry can be withdrawn sooner, and thus ice slurry brine can be added sooner based on the level regulation or fill level control. The slanted position is controlled by way of a regulating unit, for example. In one embodiment, for example, an angular range of approximately 0° to approximately 90°, preferably from approximately 5° to approximately 35°, and most preferably an angular range of approximately 10° to approximately 20°, and preferably around 15° is set. Other values can likewise be set. In one embodiment, the slanted position is varied during the production of the ice slurry. For example, the slanted position is greater at the beginning of a production process and decreases over the course of the process. Cooling can be adjusted in keeping with the presently set slanted position. For example, stronger cooling takes place with a more heavily slanted position, for example cooling takes place to an increased extent in the region of the lower-lying heat exchanger surfaces. In one embodiment, the fill level is set in keeping with the slanted position. For example, the fill level is lower with a more heavily slanted position. In one embodiment, originally higher-lying heat exchanger surfaces are activated and/or deactivated as the slanted position decreases.

Yet another embodiment of the present invention provides for the ice slurry and/or the ice slurry brine to be conveyed in at least one direction, and preferably in multiple directions. A preferred direction is from the inlet to the outlet of the ice slurry or the ice slurry brine. As a result of the slanted position, conveying is supported by gravity, for example. In other embodiments, stirring devices or stirrers are provided, which convey by way of a helical movement, for example, such as by way of a spiral conveyor. Stirring preferably takes place along a plane of the appropriate heat exchanger surface. As a result of the slanted position or inclination and the different properties of the ice slurry and of the ice slurry brine, mixing takes place transversely to the plane along which stirring is carried out.

One embodiment of the present invention moreover provides for cooling to be carried out in parallel and/or in series on more than two surfaces of the heat exchanger device. Multiple surfaces are provided for cooling purposes. As a result of a slanted position or slanting, in particular also varying slanting, cooling does not constantly take place on the same fraction of all heat exchanger surfaces. Some of the cooling takes place in parallel. When the slanted position is changed, cooling takes place consecutively on a variable fraction of the heat exchanger surfaces.

Individual heat exchanger surfaces can preferably be activated and/or deactivated.

In addition, one embodiment of the present invention provides for level regulation. The level regulation includes regulation of a fill level of the container, regulation of a concentration of the ice slurry brine, and regulation of a slanted position. The level regulation is carried out in particular as a function of different variables such as concentration variables, temperature variables, time variables, angle variables, fill level variables and the like. Dependencies of the individual variables are preferably detected. The regulation is preferably designed as a self-learning regulation. In one embodiment, automatic optimization is carried out based on the detected values, the actual values and the setpoint values, in particular as a function of target specifications.

Still another embodiment provides for cooling to be carried out by way of indirect heat exchanger operation. For this purpose, a primary circuit and a secondary circuit are provided. For example, a food-safe brine is circulated in the primary cooling circuit. A refrigerant is circulated in the secondary circuit, for example. In another embodiment, direct heat exchanger operation having one circuit is provided. A refrigerant is circulated in the circuit, for example.

The invention encompasses the technical teaching that, in a method for air conditioning rooms, in which energy and/or heat is stored or buffered in a latent energy or heat storage system, or is withdrawn or extracted therefrom, it is provided for that ice slurry, and more particularly ice slurry produced according to a method according to the invention, is provided as the latent energy or heat storage system. For example, the energy that is stored in the ice slurry can be used not only for cooling, but also for heating rooms or the like, when using appropriately designed heat pumps and heating circuits. For this purpose, the ice slurry is appropriately stored and optionally added using appropriate control. Heating and/or cooling can be achieved when using ice slurry as an energy store. Switching between these is possible.

The invention moreover encompasses the technical teaching that, in an ice slurry production device for producing ice slurry from a liquid ice slurry brine, it is provided for that means for carrying out the method according to the invention are present. The means allow improved ice slurry production, and more particularly allow ice slurry production that is faster, more energy-efficient and optimized for large-scale production. Effective ice slurry production is achieved in particular by the flexible design, including changing the inclination or slanted position. The means in particular ensure continuous ice slurry production.

One embodiment of the present invention provides for the means to comprise a heat exchanger device, which includes multiple heat exchanger plates that are disposed at a distance from each other, at least some of which being fluidically connected to each other. The heat exchanger device comprises a heating or cooling agent circuit in which a heating or cooling agent can circulate or flow. The circuit comprises a feed and a drain. The heat exchanger plates are fluidically connected to the feed and the drain. The coolant flows through the interior space of the heat exchanger plate. A flow field is formed in the respective interior space, the flow field accordingly defining a flow of the coolant. For this purpose, corresponding flow guide means are provided in the interior space. These include protrusions, depressions, constrictions, widened regions, walls and the like. The interior space is delimited by appropriate walls. The lateral walls form the largest fraction of the walls in terms of expanse. The heat exchanger plates are preferably designed as plates having a circular cross-section, or as circular ring-shaped plates, having two side walls and one or two circumferential walls. The respective side wall has an outer side, this being the heat exchanger surface, and an inner side. The flow guide means extend from an inner side to the opposite inner side in one embodiment. In another embodiment, the flow guide means do not extend from an inner side to the opposite inner side, but project from one side in the direction of the other side, or transversely thereto, without making contact with the respective other side. The flow guide means have identical and/or different orientations. For example, an arbitrary flow field is formed in the interior space for optimized flow.

The heat exchanger plates preferably have a central through-passage, through which an axle or a shaft can extend, for example. The heat exchanger plates are preferably oriented concentrically with respect to each other. In one embodiment, the heat exchanger plates are connected to the feed or to the drain which is located outside the heat exchanger plates, so that the feed or the drain is disposed radially outside the heat exchanger plates. In another embodiment, a receptacle for at least a portion of the feed and/or of the drain is provided, which is integrated at least partially into the heat exchanger plates. For example, a respective through-passage for the feed and/or the drain is provided in the respective heat exchanger plate. The respective heat exchanger plate accordingly is connected to the feed or drain which is located inside the heat exchanger plate. Preferably multiple heat exchanger plates are oriented parallel to each other along an at least imaginary axis extending through the heat exchanger plates. The heat exchanger plates are preferably designed rotationally symmetrical with respect to the axis. Eccentric forms are provided in other embodiments. In one embodiment, the heat exchanger plates are disposed at a fixed distance from each other. The heat exchanger plates are preferably designed to have the same distance from each other. In other embodiments, the heat exchanger plates are spaced differently from each other, for example at different distances. In another embodiment, the heat exchanger plates are disposed at variable distances from each other. For example, the heat exchanger plates can thus be disposed more closely together or further apart from each other. In this way advantages can be achieved, in particular for transport or for a changed slanted position during operation. In one embodiment, a locking mechanism for locking the respective heat exchanger plate in a position is provided.

According to another embodiment of the present invention, the means include a regulating device for down-regulating the heat exchanger device when an ice slurry layer thickness is exceeded and up-regulating the heat exchanger device in the event of a drop below the ice slurry layer thickness. Down-regulating or up-regulating refers to changing the power of the heat exchanger device, for example so as to lower (down-regulate) or raise (up-regulate) a cooling power. The regulating device includes an ice layer thickness detection function.

According to another embodiment of the present invention, a stirring device, which is disposed at a distance from the heat exchanger device, is provided for stirring the ice slurry brine and/or the ice slurry, without making contact with the heat exchanger device. The stirring device is designed so as not to make contact with the heat exchanger device, and more particularly with the heat exchanger plates. The stirring device preferably comprises a drive unit, and preferably a drive shaft. The drive shaft is preferably disposed through the central through-passages of the heat exchanger plates. To this end, the drive shaft is disposed at a distance from the heat exchanger plates. Stirring elements, which are disposed at a distance from the respective heat exchanger plates, project radially from the drive shaft. The stirring elements are designed as stirring rakes, for example. In another embodiment, the stirring elements are designed as stirring paddles. In still another embodiment, the stirring elements are designed as stirring rods. Yet another embodiment provides for the stirring elements to be designed as stirring brushes, and another embodiment is a combination of these. Further embodiments of the stirring elements are conceivable. The stirring elements are rotated by the drive shaft in the intermediate space between two neighboring heat exchanger plates. As a result, they push the ice slurry or ice slurry brine radially outward. Since the drive shaft is disposed at a distance from the respective heat exchanger plate, ice slurry brine or ice slurry can move up. For stirring to the outside, the stirring elements comprise appropriate conveying or guide means. The stirring device or the stirrer is coupled to the regulating unit and/or to the stirring device, or is at least partially integrated therein. The regulating unit is responsible for the switching of stirring intervals, stirring speed and the like. The controlled variable that is used can be the brine and/or ice slurry consistency, the power consumption, such as that of the stirrer motor, the temperature of the container wall and/or of the container contents or the like.

Moreover, in one embodiment of the present invention, it is provided that the means include an inclination regulating unit for inclining the ice slurry production device. The inclination regulating unit is preferably disposed on the outside of the container in which the heat exchanger device and the stirring device are disposed. The inclination regulating unit preferably comprises one or more extendable and/or pivotable pedestals, mountings or the like. In one embodiment, a weighing device is provided, on which the container is disposed. Weighing feet or weighing sensors are accordingly provided, in the place of simple pedestals. In this way, it is possible to detect the weight and/or regulate or control the weight when drawing off or supplying ice slurry or ice slurry brine. In particular a metering device can thus be implemented by way of weight control. In one embodiment, a level detection unit is provided for, which detects an angle of inclination. In another embodiment a drive is provided, for example a hydraulic, pneumatic or other drive.

Moreover, according to one embodiment of the present invention, the means include a conveying device, preferably integrated into the stirrer, for conveying the ice slurry or the ice slurry brine. Conveying preferably occurs from an inlet to an outlet. For example, the inlet and the outlet are not located at the same height. The outlet is preferably located at a higher level, so that conveying occurs in the direction of the outlet with an appropriate inclination.

The invention further encompasses the technical teaching that it is provided that an energy system, in particular an air conditioning system for air conditioning rooms and/or for heating process water or the like, as an energy source for heat pump systems, in which energy and/or heat is stored in a latent energy or heat storage system and/or extracted or discharged therefrom, includes an ice slurry production device according to the invention for carrying out a method according to the invention, so as to provide ice slurry, and more particularly ice slurry produced using the ice slurry production device according to the invention, as the latent energy or heat storage system.

Finally, the invention encompasses the technical teaching that a use of ice slurry, and more particularly of ice slurry produced according to a method according to the invention and/or produced using an ice slurry production device according to the invention, as a latent energy or heat storage system is provided, in particular for cooling foodstuffs such as in fresh fish refrigeration, dough refrigeration, in energy or heat storage such as the storage of latent energy or heat in energy or thermal systems, energy or heat recovery systems and the like.

In one embodiment, the device is used for the operation with a heat pump. In this process, the ice slurry is produced as a waste product, for example. By using ice slurry in such a system, a high energy performance latent heat storage system is implemented.

When using a device, heat from solar radiation and/or heat from the ambient air is used. A portion of the heat is buffered in the ice water storage tank, where the heat is stored substantially loss-free. The extremely high heat transfer in the water/ice storage tank allows this to have a capacity of 300 to 400 liters, for example. During the summer, the heat pump requires no energy, or only very little energy. When it is used as a heating device, the heating device preferably comprises at least one hybrid collector, a heat pump, a liquid ice storage tank, and a heat storage system. In particular space-saving energy storage systems are provided as the liquid ice storage tank or water/ice storage tank. In conjunction with a heat pump, energy can be used at a usable temperature level, for example for heating a room and/or for heating hot water. The closer the required usage temperature is to the melting point of water, the higher the efficiency, and the lower the current for the heat pump in order to achieve the desired temperature. The components of a corresponding heating device—the ice storage tank, the collector and the heat pump—are designed for the respective heat requirements. An adsorber is running continuously, which is to say during the day and also at night. Special hybrid collectors still absorb sufficient heat even with diffuse light levels and under cloudy conditions, so as to convert the same into usable heat thereafter or store the excess supply in the (liquid) ice storage tank. During summer days, hot water supply can be handled directly by collectors, without the heat pump, by conducting the heat into the buffer storage unit. During the winter, the energy is conducted into the heater or the buffer storage unit, if the temperatures of the collectors are sufficient. If the temperatures are not sufficient, the heat is brought to the usable temperature by the heat pump or stored in the ice storage tank on an intermediate basis. The hot water storage tank keeps the heat energy that is required for generating hot water available. In this way, heating using ice or liquid ice is possible in a simple manner. Heating using ice is based on the following physical principle: the so-called heat of crystallization can be extracted as a result of the formation of crystals by way of energy withdrawal during ice formation. During thawing, exactly the same heat must be supplied again. This can be repeated any arbitrary number of times and is a characteristic of water as a medium. The water/ice storage tank or liquid ice storage tank is not used as the actual heat source for this purpose, but always as an intermediate storage unit that is loaded and unloaded any arbitrary number of times. Heat is withdrawn from the liquid ice storage tank as follows: heat is extracted from the water by way of a heat pump until ice forms. With powerful ice storage heat exchangers, the heat pump operates particularly efficiently until the water has completely frozen having a freezing temperature of 0 degrees, since the operating temperature of the heat pump does not drop. It is important for high heat transmission in the high performance ice storage tank that the heat exchanger have a large surface and that there be a small distance of just a few centimeters at the heat exchanger surfaces. The heat extracted by the heat pump can be used at a higher (usable) temperature by the heat pump dissipating his heat to a buffer storage unit for heating, or for heating water. Preferably liquid ice is used, which is made available via the device according to the invention. In this case, the device forms part of the heating device. The heat supply via the ice storage tank takes place as follows: energy or heat can be supplied to the ice storage tanks, for example, by way of an air-to-air heat exchanger comprising a fan, solar collectors, or a combination thereof, known as hybrid collectors. The more efficiently the collectors operate, for example, being even able to cause snow to slide off or thaw, the smaller the ice storage tank can be.

In this case, a design intended for one night is sufficient, since even a cloudy sky the next day suffices to harvest sufficient energy again via the collectors. Instead or an ice storage tank, or in addition to this, a liquid ice storage tank is preferably provided. The energy that is extracted from the ice during freezing can be used for heating purposes. This offers two important advantages: ice storage tanks, and more particularly liquid ice storage tanks, are relatively inexpensive and extremely space-saving. The operating principle is as follows: when one liter of ice having a temperature of zero degrees Celsius is converted into water (thawed), the energy that is required is the same as when heating one liter of water having a temperature of zero degrees Celsius to eighty degrees Celsius. In this way, eight times the amount of energy can be stored in the same volume as compared to a water storage tank. Due to the involvement of a heat pump, low-temperature energy can be rendered usable by bringing it to appropriate temperatures for heating and for heating hot water. As a result of the high energy density, a lot of space can be saved. The liquid ice generator differs drastically with regard to the method of producing the ice in terms of the type of ice use, which is to say, solidly frozen water with ice heating, as compared to liquid ice brine with the liquid ice generator. Liquid ice, ice slurry or pumpable ice is preferably used here. When using the liquid ice generator, a closely similar kind of energy extraction (energy recovery) and storage can be practiced. The advantage of liquid ice is that it thaws very quickly even when small amounts of heat are supplied. In this way, the liquid ice generator can be used very well as a renewable heat source for heat pumps, even at very low temperatures just above 0° C. and weak solar radiation.

The invention will be described hereafter in greater detail based on exemplary embodiments shown in the drawings. Uniform reference numerals are used for identical or similar components or features. Features or components of different embodiments can be combined so as to obtain further embodiments. All of the features and/or advantages that are apparent from the claims, the description or the drawings, including design details, arrangement in terms of space, and method steps, can thus be essential to the invention, both alone and in a wide variety of combinations.

DETAILED DESCRIPTION OF THE INVENTION

Figure 1:
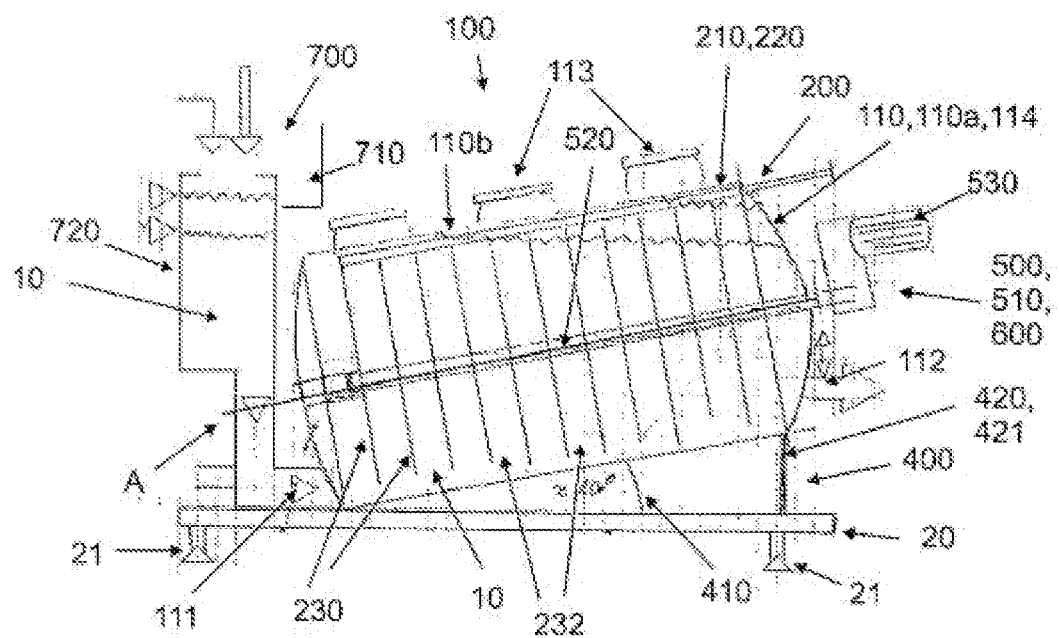
FIG. 1 schematically shows a cross-sectional view of an ice slurry production device.

FIGS. 1 to 14 show different embodiments of a heat exchanger device 100 in different views and levels of details. Identical or similar components are denoted by identical reference numerals. A detailed description of components that were already described is dispensed with.

The ice slurry production device 100 for producing ice slurry from a liquid ice slurry brine comprises means for carrying out a method for producing ice slurry from an ice slurry brine 10, wherein the liquid ice slurry brine 10 is filled into a housing 110, the liquid ice slurry brine 10 is cooled by bringing it into contact with a heat exchanger device 200 disposed in the housing 110 while stirring the ice slurry brine 10, so as to generate the ice slurry, wherein, when an ice layer forms on the heat exchanger device 200, cooling is interrupted as soon as the ice layer reaches a predetermined thickness and cooling is continued as soon as the ice layer drops below the predetermined thickness.

The ice slurry production device 100 comprises corresponding means, which include the heat exchanger device 200. The means further include a regulating device. The means moreover include a stirring device 500. The means additionally include an inclination regulating unit 400. The means further include a conveying device 600. The ice slurry production device 100 is disposed on a floor or a support base 20, which can also be designed as a weighing device. The inclination regulating unit 400 can be used to bring the ice slurry production device 100 into a slanted position, or to incline it, with respect to the support base 20, as is shown in FIG. 1. An angle of inclination 410, at which the ice slurry production device 100 is inclined with respect to the support base 20, can be set by way of the inclination regulating unit 400. The angle of inclination 410 here is calculated from a slanted position of the housing 110 of the ice slurry production device 100, or an axis A of the ice slurry production device 100, with respect to the support base 20. The inclination regulating unit 400 comprises at least one adjustable inclination element 420, which can be extended. The inclination element 420 is designed as an extendable pedestal 421 here. The support base 20 is preferably part of the inclination regulating unit 400. For the ice slurry production device 100 to rest on a supporting structure, the inclination regulating unit 400 comprises appropriate pedestals 21, which can also be designed as weighing feet.

In addition to the ice slurry brine 10, the heat exchanger device 200 is also disposed, at least partially, in the container 110. The heat exchanger device 200 comprises a flow or feed 210 for a heating or refrigerating agent (in short, a refrigerant), a drain or return 220 for the refrigerant, and multiple heat exchanger plates 230 that are fluidically connected to the flow 210 and the return 220. The refrigerant can flow through the heat exchanger plates 230. So as to achieve optimal flow, the heat exchanger plates 230 have an interior space, which is surrounded by two end-face side walls and a wall disposed in the manner of a lateral face thereto, and the interior space is fluidically connected both to the flow 210 and to the return 220. For the formation of an appropriate through-flow, various flow guide means 235 are disposed in the interior space so as to implement a particular flow field, for example. The flow 210 and the return 220 are disposed eccentrically relative to the heat exchanger plates 230. The flow 210 and the return 220 extend in the axial direction A. The housing 110 further comprises a supply point 111 and a draw-off point 112. As is indicated by the arrows at 111 and 112, the supply of ice slurry brine 10 or the removal of ice slurry takes place accordingly.

The ice slurry brine 10 is supplied to the container or the housing 110 via the supply point 111. For this purpose, the ice slurry brine 10 is supplied to the housing 110 via a level regulating unit 700. The level regulating unit 700 comprises a first brine container 710 and a second brine container 720. A saturated ice slurry brine 10 is stocked in the first brine container 710, for example a saturated salt solution. The second brine container 720 holds the ice slurry brine 10 having a desired ice slurry brine concentration, for example a 0.5 to 3.5% salt solution (volume % or mass %). So as to obtain the desired concentration value, the concentration in the second brine container 720 is detected. If the concentration exceeds the desired concentration value, the ice slurry brine 10 is diluted, for example by supplying ice slurry brine 10 having a lower concentration or water. If the concentration is below the desired concentration value, the ice slurry brine 10 is concentrated, for example by supplying ice slurry brine 10 having a higher concentration, preferably using saturated ice slurry brine 10 from the first brine container 710. If a desired concentration is present, the ice slurry brine 10 from the second brine container 720 is supplied to the container 110. Supplying takes place in keeping with the level regulating unit 700. In addition to regulating the concentration of the ice slurry brine 10, this unit regulates in particular the ice slurry brine 10 in the second brine container 720, as well as other parameters. For example, the level regulating unit 700 also regulates the fill level of the ice slurry brine 10 in the container 110. For example, this is done by way of a float gauge measurement, visually or using other means. So as to produce ice slurry from the ice slurry brine 10, the ice slurry brine 10 is cooled, and more particularly pre-cooled, in the container 110. For this purpose, the level regulating unit 700 includes a refrigeration controller or a corresponding refrigeration circuit. The ice slurry brine 10 is cooled by bringing it in contact with heat exchanger surfaces of the heat exchanger plates 230. To produce ice slurry, it is necessary to mix ice slurry brine 10 and crystallized or frozen ice slurry brine 10. This is done by way of the stirring device 500. The stirring device 500 comprises a stirring drive 510. The stirring drive 510 comprises a stirring shaft 520 and a stirring motor 530 driving the stirring shaft 520. The stirring shaft 520 is disposed centrically relative to the heat exchanger plates 230. For this purpose, the heat exchanger plates 230 each have a central through-passage 231, through which the stirring shaft 520 extends. Projecting radially outwardly, the stirring shaft 520 comprises stirring elements 540, which are designed to mix or stir the ice slurry brine 10, or the ice slurry, or the mixture of both. The stirring elements 540 are disposed in the intermediate spaces 232 between the heat exchanger plates 230. The stirring elements 540 have a paddle-like design, so that the ice slurry brine 10 or the ice slurry is moved radially outwardly away from the stirring shaft 520 in the direction of the container wall 110*b*. The ice slurry brine mixture that is richer in ice is preferably transported radially outwardly. The ice slurry brine mixture containing less ice, or the ice slurry brine 10, follows in through the through-passages 231 of the heat exchanger plates 230. In this way, efficient mixing is achieved. Moreover, improved mixing takes place due to the slanted position of the container 110, and thus of the heat exchanger device 100 and the stirring device 500. Mixing is supported by the action of gravity. So as to additionally convey the ice slurry or the ice slurry brine 10, the appropriate conveying device 600 is provided. This is integrated into the stirring device 500 in the embodiments shown here, in particular by the shape of the stirring elements 540. The conveying device 600 is also partially integrated into the inclination regulating unit 400 since the slanted position supports conveying of the ice slurry or of the ice slurry brine 10. Due to the slanted position and the lower density of the ice slurry compared to the ice slurry brine 10, the ice slurry moves from the lowest point, where the supply point 111 is located, toward a higher location. The draw-off point 112 is formed at the higher location. The slanted position ensures that the ice slurry, or depending on the slanted position an ice slurry mixture having a lower content of ice slurry brine 10, is present at the draw-off point 112 and can be drawn off there. So as to accelerate the ice slurry production process, drawn-off ice slurry or ice slurry mixture can be recirculated to the supply point 111 and re-supplied to the container 10. The slanted position can be adjusted for this purpose, for example.

FIG. 1 schematically shows a cross-sectional view of the ice slurry production device 100. Here, the composition is schematically illustrated. The container 110 has three maintenance openings 113. The set angle of inclination is approximately 10°. The container 110 is filled almost to the rim. Two different fill levels are indicated, which can be set by way of the level regulating unit 700. The stirring shaft 520 is mounted on an end-face wall or end face 110*a* of the container 110 near the supply point 111. The stirring motor 530 is provided on the opposite side. It is located outside the container 110. The stirring shaft 520 penetrates the end wall or end face 110*a* on the draw-off point side of the container 110 and is appropriately sealed. As a result of the slanted position, a pressure exerted by the ice slurry brine 10, or the ice slurry, on the seal is lower than at the supply-side end face 110*a*. The slanted position accordingly improves sealing.

Figure 2:
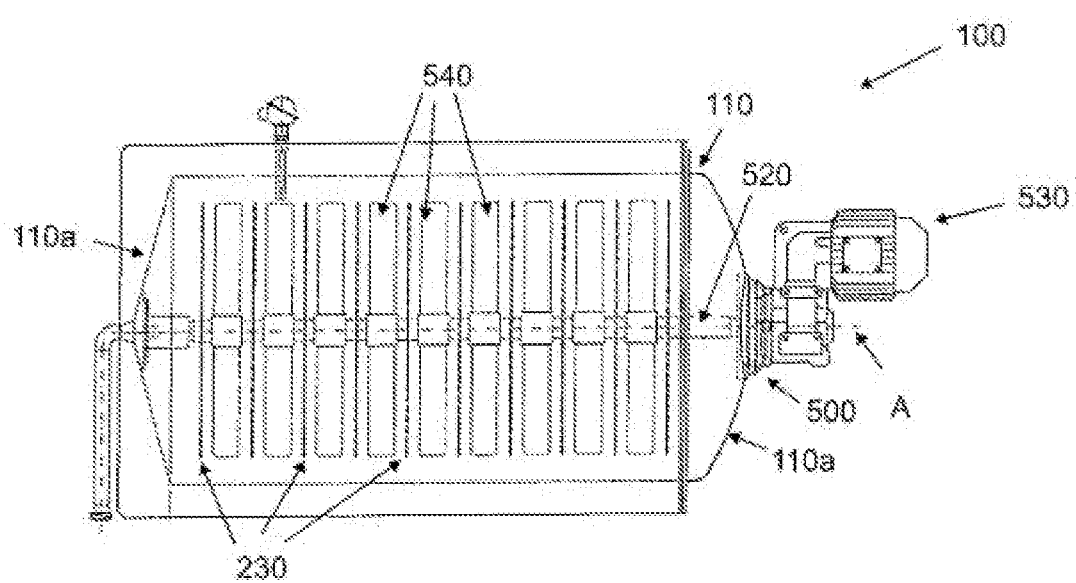
FIG. 2 schematically shows a section of an ice slurry production device in another cross-sectional view.

FIG. 2 schematically shows a section of the ice slurry production device 100 in another cross-sectional view. The level regulating unit 700 is not shown here. As in FIG. 1, the insulated container or the housing 110 is designed as a thin-walled, approximately cylindrical container 110 having two end faces 110*a* that curve slightly to the outside. The container 110 accordingly extends along the axial direction A. The central axis of the container 110 and the central axis of the stirring shaft 520 are formed concentrically with respect to each other. The heat exchanger plates 230 are designed as circular ring-shaped plates and project radially outwardly from an imaginary central axis. The imaginary central axis of the heat exchanger plates 230 is disposed concentrically with respect to the central axis of the stirring shaft 520 and of the container 110. The heat exchanger plates 230 are disposed at identical distances from each other in the axial direction A. Radially, the heat exchanger plates 230 are disposed at identical distances from the side wall 110*b* of the container 110. The stirring elements 540 are disposed between the heat exchanger plates 230 so as to project radially outward. The stirring elements 540 are formed at identical distances from each other in the axial direction A and have substantially identical designs. The stirring elements 540 are disposed at a distance from the heat exchanger plates 230 for contactless stirring. The stirring elements 540 are formed at a distance from the side wall 110*b* of the container 110 in the axial direction A.

Figure 3:
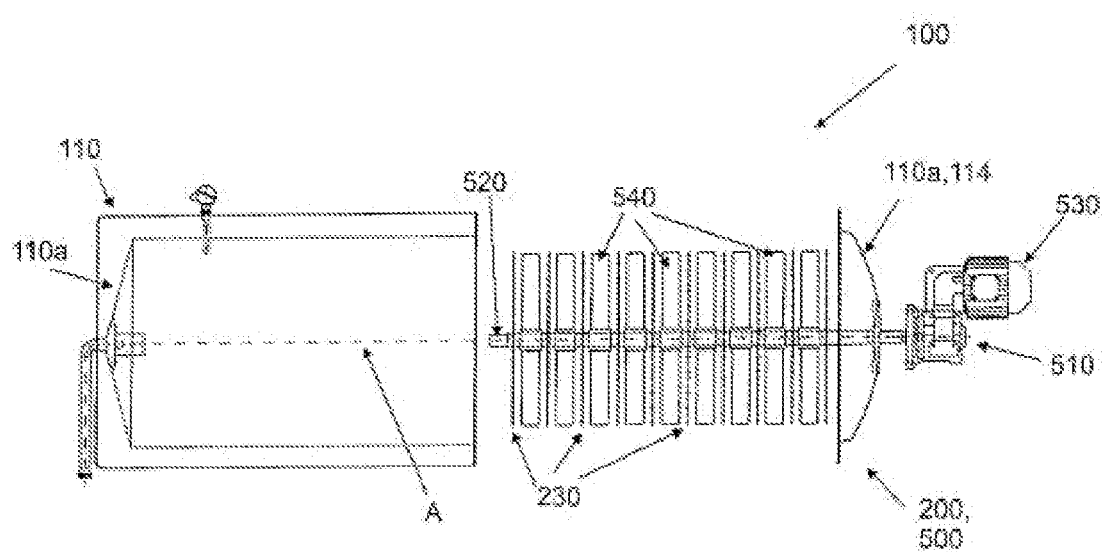
FIG. 3 schematically shows an exploded illustration of the ice slurry production device of FIG. 2.

FIG. 3 schematically shows an exploded illustration of the ice slurry production device 100 of FIG. 2. The heat exchanger device 200 is preferably integrated with the stirring device 500, so that both can be inserted into the container 110 together during installation. A cover 114 of the container 110, which is designed as a removable end wall 110*a*, is preferably likewise integrated with the heat exchanger device 200 and/or the stirring device 500.

Figure 4:
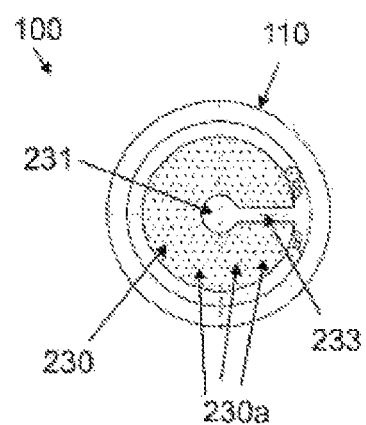
FIG. 4 schematically shows another cross-sectional view of the ice slurry production device of FIG. 3.

FIG. 4 schematically shows another cross-sectional view of the ice slurry production device 100 of FIG. 3. The view does not show the stirring device 500. The container 110 has a substantially hollow-cylindrical design. The heat exchanger plates 230 are disposed at radially constant distances from the side wall 110*b* of the container 110. The heat exchanger plates 230 have the central through-passage 231 for the stirring shaft 520. The central axis of the through-passage 231 is concentric with respect to the center axis of the container 110. The interior space of the heat exchanger plates 230 has a flow field. The flow field is also defined by welds, depressions or other flow guide means 235 of the heat exchanger surfaces in the direction of the interior space. A slot 233 for a lateral installation of the stirring shaft 540 into the through-passage 231 extends radially outwardly from the central through-passage 231. The feed 210 and the drain 220 are disposed between a radially outer edge of the heat exchanger plate 230 and the side wall 110*b* of the container 110. The feed 210 and the drain 220 extend in the axial direction A.

Figure 5:
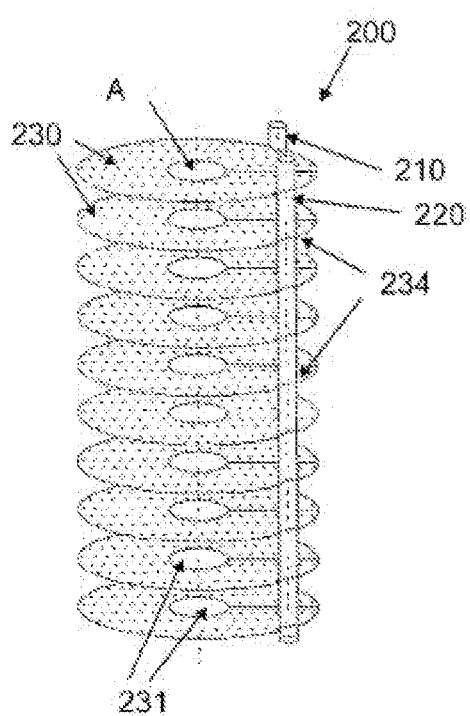
FIG. 5 schematically shows a perspective view of a heat exchanger device of an ice slurry production device.

FIG. 5 schematically shows a perspective view of another heat exchanger device 200 of the ice slurry production device 100. In the embodiment shown here, the heat exchanger plates 230 have no slot 233. The stirring shaft 520 is inserted axially through the through-passages 231 here. The flow 210 and the return 220 are partially accommodated in the heat exchanger plates 230. The heat exchanger plates 230 have appropriate receptacles 234 for this purpose, as is shown in FIG. 6.

Figure 6:
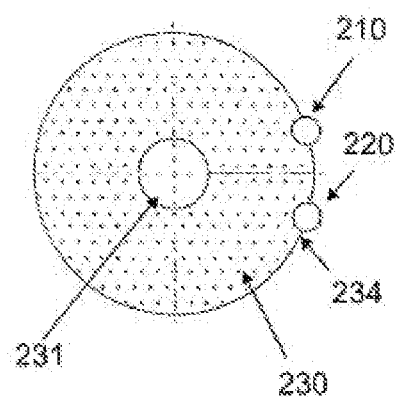
FIG. 6 schematically shows a top view onto the heat exchanger device of FIG. 5.

FIG. 6 schematically shows a top view onto the heat exchanger device 200 of FIG. 5. The receptacles 234 for the flow 210 and the return 220 are formed on an outer edge of the heat exchanger plate 230, wherein these interrupt the edge. A feed 210 and/or return 220 received there protrudes over the edge in the direction of the side wall 110*b* of the container 110. A fluidic connection of the interior space of the heat exchanger plate 230 to the feed 210 or the drain 220 is thus established without external connecting means, but is integrated.

Figure 7:
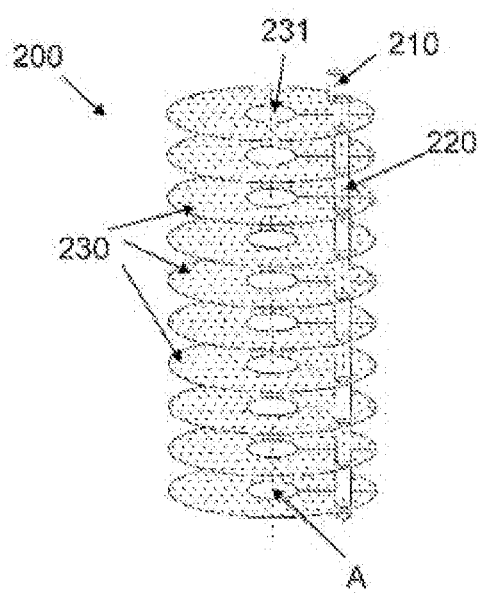
FIG. 7 schematically shows a perspective view of another heat exchanger device of an ice slurry production device.

FIG. 7 schematically shows a perspective view of another heat exchanger device 200 of an ice slurry production device 100. Having a composition that is otherwise identical to that of the exemplary embodiment according to FIGS. 5 and 6, the embodiment according to FIG. 7 includes receptacles 234 that do not interrupt the edge, but are designed as eccentric through-passages in the heat exchanger plate 230. A feed 210 or drain 220 received there does not protrude radially over the edge of the heat exchanger plate 230. Thus, the radial distance from the heat exchanger plates 230 to the side wall 110*b* of the container 110 must be dimensioned smaller.

Figure 8:
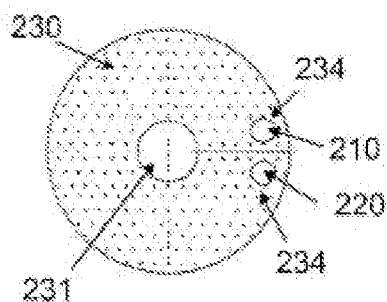
FIG. 8 schematically shows a top view onto the heat exchanger device of FIG. 7.

FIG. 8 schematically shows a top view onto the heat exchanger device 200 of FIG. 7. The two receptacles 234 designed as through-passages penetrate the heat exchanger plate 230, wherein the cross-section of the receptacle 234 is located completely inside the corresponding cross-section of the heat exchanger plate 230. One embodiment of the ice slurry production device 100 including the heat exchanger device 200 according to FIG. 4 is shown in FIG. 9.

Figure 9:
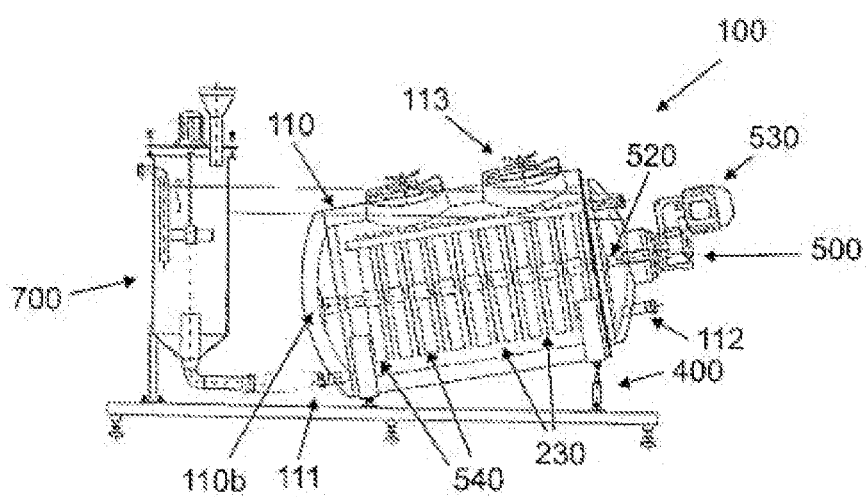
FIG. 9 schematically shows a side view of an ice slurry production device.

FIG. 9 schematically shows a side view of the ice slurry production device 100 including the heat exchanger device 200 of FIG. 8. The feed 210 and the return 220 do not radially extend laterally from the heat exchanger plates 230, but penetrate these. In this way, a uniform distance is achieved in the radial direction between the heat exchanger plates 230 and the housing 110. The composition shown in FIG. 9 essentially corresponds to the exemplary embodiment of FIG. 1. The ice slurry production device 100 has a more compact design, comprising a container 110 having two maintenance openings 113. The heat exchanger device 200 comprises nine heat exchanger plates 230. The stirring device 500 comprises ten stirring elements 540.

Figure 10:
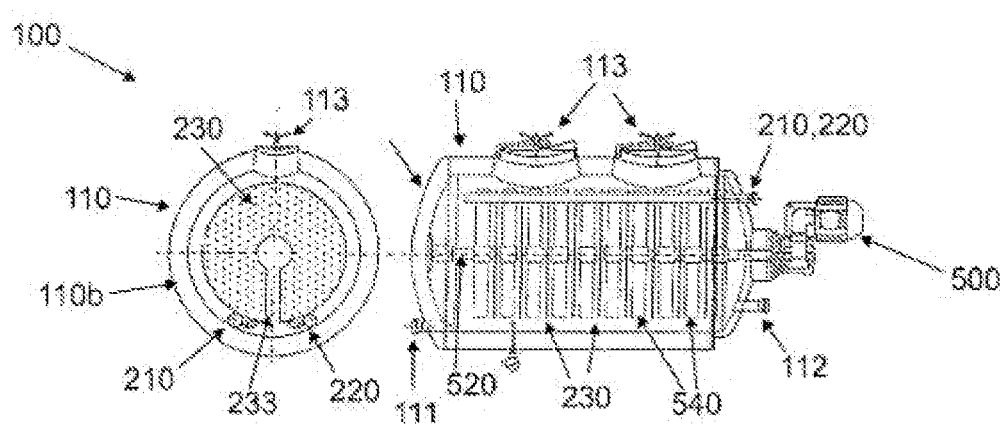
FIG. 10 schematically shows a front view and a side view of a section of the ice slurry production device of FIG. 9.
Figure 11:
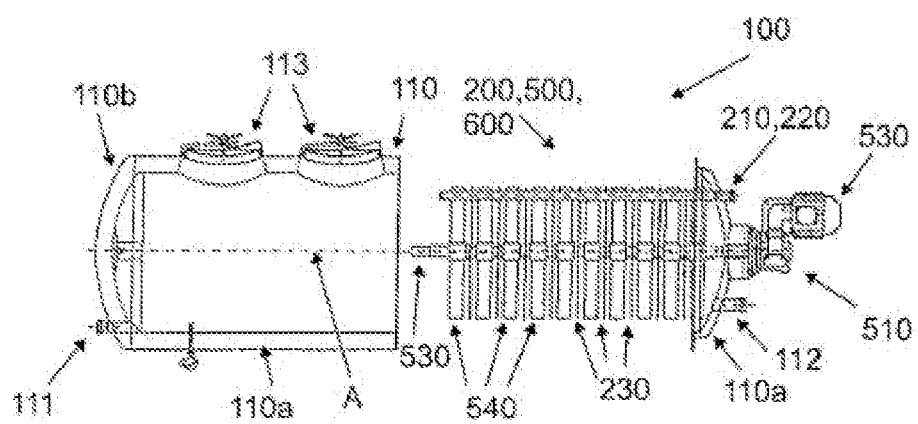
FIG. 11 schematically shows a partially exploded side view of the ice slurry production device of FIG. 10.

FIG. 10 schematically shows a front view and a side view of a section of the ice slurry production device 100 of FIG. 9, however comprising a heat exchanger device 200 which has a slot 233 for installing the stirring shaft 520 and in which the flow 210 and the return 220 are disposed radially laterally from the heat exchanger plates 230. FIG. 11 schematically shows a partially exploded side view of the ice slurry production device 100 of FIG. 10. The relatively large radial distance between the heat exchanger plates 230 and the container 110 is apparent here, which corresponds at least to the width in the radial direction of the feed 210 or the drain 220.

Figure 12:
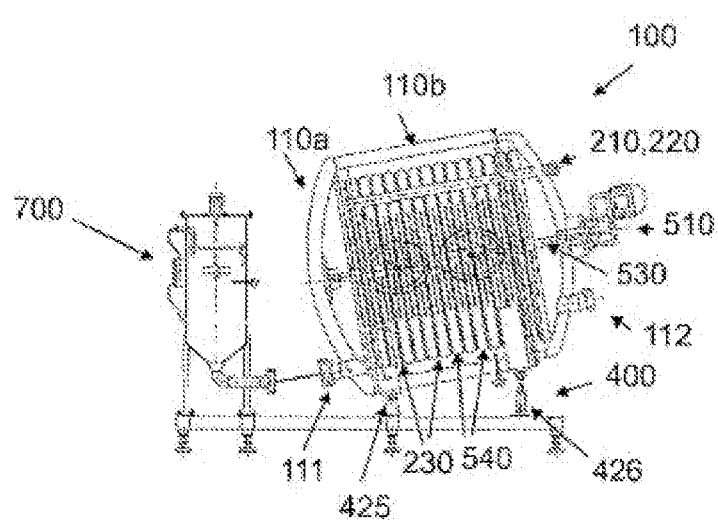
FIG. 12 schematically shows a cross-sectional view of another ice slurry production device.

FIG. 12 schematically shows a cross-sectional view of another ice slurry production device 100. The ice slurry production device 100 is designed larger than in the previous exemplary embodiment and accordingly comprises more heat exchanger plates 230, which additionally have a larger heat exchanger surface, and accordingly more stirring elements 540. The inclination regulating unit 400 comprises a pivot bearing 425, one end of which rotatably mounts the container 110. A linear actuator 426, which is flexibly connected to the container 110, is formed at an axial distance therefrom. The angle of inclination 410 can be adjusted by displacing the linear actuator 426.

Figure 13:
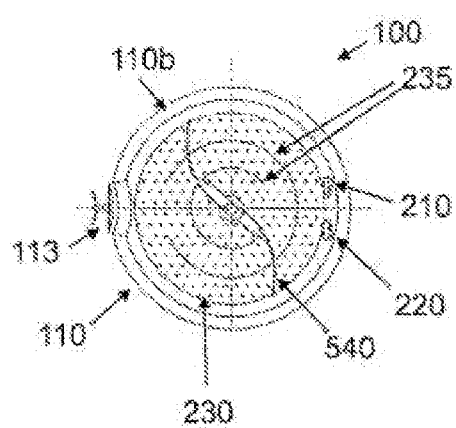
FIG. 13 schematically shows another cross-sectional view of the ice slurry production device.

FIG. 13 schematically shows another cross-sectional view of the ice slurry production device 100. The stirring shaft 520 is disposed in the central through-passage 231 of the heat exchanger plate 230. The feed 210 and the drain 220 are disposed at a radial lateral distance from the heat exchanger plate 230 between the heat exchanger plate 230 and the side wall 110b of the container 110. The stirring element 540 extends radially from the stirring shaft 520. The stirring element 540 has a propeller-like or paddle-like design here. The profile of the stirring element 540 has an S-shaped cross-section. In addition, the stirring element 540 has a changed curvature in the axial direction A, so as to cause additional conveying in a further direction, this being the axial direction. In this way, the conveying device 600 is integrated into the stirring device 500. Conveying thus takes place radially along the heat exchanger surfaces. As a result of the S-shaped curvature and the centrifugal forces, conveying takes place radially outwardly in the direction of the side wall 110b of the container 110. In addition, conveying takes place in the axial direction A due to the axial curvature of the stirring element 540. As a result, three-dimensional mixing and/or conveying takes place, which is additionally supported by the slanted position of the axis A or of the housing 110.

Figure 14:
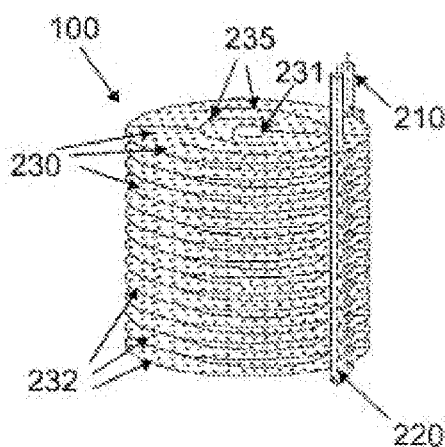
FIG. 14 schematically shows a perspective view of a heat exchanger device of the ice slurry production device of FIG. 13.

FIG. 14 schematically shows a perspective view of the heat exchanger device 200 of the ice slurry production device 100 of FIG. 13. The flow 210 and the return 220 extend radially outside the heat exchanger plates 230. The interior of the heat exchanger plates 230 has a flow field. The flow field has circular arc-like walls as flow guide means 235, which extend from an inner side of the heat exchanger plate 230 to the opposite side. A flow path is thus defined for the refrigerant in the interior space. In addition, protrusions or depressions are provided in the interior space, which cause improved swirling of the refrigerant in the interior space. In this way, more effective heat transmission is achieved.

The device is suitable for a wide variety of application purposes. For example, the device can also be used with substance mixtures that separate in predetermined temperature ranges, for example a gas-liquid mixture into a liquid phase and a gaseous phase. The device is thus used with substance separation in sewage treatment plants, for example.

It goes without saying that a number of additional embodiments exist, although the above abstract and the detailed description of the figures describe only one exemplary embodiment. Rather, the detailed description above will be useful to a person skilled in the art as a suitable instruction for implementing at least one exemplary embodiment. Additionally, the above features of the invention can, of course, be used not only in the respectively described combination, but also in other combinations or alone, without departing from the scope of the invention.

LIST OF REFERENCE NUMERALS 10 ice slurry brine
20 support base
21 pedestal
100 ice slurry production device
110 housing (container)
110a end face
110b side wall
111 supply point
112 draw-off point
113 maintenance opening
114 cover
200 heat exchanger device
210 flow/feed
220 return/drain
230 heat exchanger plate
231 through-passage
232 intermediate space
233 slot
234 receptacle
235 flow guide means
400 inclination regulating unit
401 angle of inclination
420 inclination element
421 pedestal
425 pivot bearing
426 linear actuator
500 stirring device
510 stirring drive
520 stirring shaft
530 stirring motor
540 stirring element
600 conveying device
700 level regulating unit
710 brine container (first)
720 brine container (second)
A axis, axial direction

The invention claimed is:

1. A method for continuously producing ice slurry from a liquid ice slurry brine, comprising the following steps:
filling a housing with the liquid ice slurry brine; cooling the liquid ice slurry brine by bringing the liquid ice slurry brine into contact with a heat exchanger device disposed in the housing while stirring the ice slurry brine with a stirring device so as to generate the ice slurry, wherein, when an ice layer forms on a surface of the heat exchanger device, cooling is interrupted as soon as the ice layer reaches a predetermined thickness, and cooling is continued as soon as the ice layer drops below the predetermined thickness, the ice slurry brine and/or ice being moved radially outwardly along the heat exchanger surface during stirring,
wherein stirring takes place without the stirring device making contact with the heat exchanger device.

2. The method according to claim 1, wherein a layer thickness detection is carried out.

3. A method according to claim 1, wherein the method is carried out with the housing inclined.

4. A method according to claim 1, wherein
the ice slurry and/or the ice slurry brine is conveyed in at least one direction.

5. A method according to claim 1, wherein cooling is carried out in parallel on more than two surfaces of the heat exchanger device.

6. A method according to claim 1, wherein level regulation is carried out.

7. A method according to claim 1, wherein cooling is carried out by way of indirect heat exchanger operation.

8. A method for air conditioning rooms, in which energy or heat is stored or buffered in a latent energy or heat storage system, or is removed or extracted therefrom, wherein ice slurry produced according to a method according to claim 1, is provided as the latent energy or heat storage system.

9. An ice slurry production device for continuously producing ice slurry from a liquid ice slurry brine, wherein means for carrying out the method according to claim 1 are provided.

10. The ice slurry production device according to claim 9, wherein the means include a heat exchanger device, which comprises multiple heat exchanger plates which are disposed at a distance from each other, at least some of which being fluidically connected to each other, and stirring elements that comprise appropriate conveying or guide means being provided for stirring to the outside of the housing.

11. An ice slurry production device according to claim 9, wherein the stirring device, which is disposed at a distance from the heat exchanger device, is provided for stirring the ice slurry brine and/or the ice slurry without the stirring device making contact with the heat exchanger device.

12. An ice slurry production device according to claim 9, wherein the means include an inclination regulating unit for inclining the ice slurry production device.

13. A method of using ice slurry produced according to a method according to claim 1 for cooling foodstuffs in energy or heat storage including at least one of the storage of latent energy or heat in energy or thermal systems, energy or heat recovery systems.

14. A method of using ice slurry produced using an ice slurry production device according to claim 9 for cooling foodstuffs in energy or heat storage including at least one of the storage of latent energy or heat in energy or thermal systems, energy or heat recovery systems.

* * * * *